United States Patent [19]

Reczek et al.

[11] Patent Number: 5,645,774
[45] Date of Patent: Jul. 8, 1997

[54] METHOD FOR ESTABLISHING A TARGET MAGNETIC PERMEABILITY IN A FERRITE

[75] Inventors: Steven T. Reczek, Penfield; Alexander Rozin, E. Rochester; Thomas F. Pomponio, Rochester, all of N.Y.

[73] Assignee: Ferronics Incorporated, Fairport, N.Y.

[21] Appl. No.: 376,758

[22] Filed: Jan. 23, 1995

(Under 37 CFR 1.47)

[30] Foreign Application Priority Data

Sep. 19, 1989 [JP] Japan .................................. 1242788

[51] Int. Cl.⁶ .................................................. B28B 11/00
[52] U.S. Cl. .......................... 264/40.1; 264/232; 264/233; 264/340; 264/611
[58] Field of Search .......................... 264/40.1, 56, 60, 264/233, 232, 340

[56] References Cited

U.S. PATENT DOCUMENTS

| | | | |
|---|---|---|---|
| 3,837,910 | 9/1974 | Van Der Laan et al. | 117/234 |
| 4,169,026 | 9/1979 | Kikuchi et al. | 204/129.65 |
| 4,214,960 | 7/1980 | Kobayashi et al. | 204/129.65 |
| 4,372,865 | 2/1983 | Yu et al. | 252/62.62 |
| 4,781,852 | 11/1988 | Kaczur et al. | 252/62.59 |
| 4,837,923 | 6/1989 | Brar et al. | 29/603 |
| 4,875,970 | 10/1989 | Takeya et al. | 156/645 |
| 4,892,672 | 1/1990 | Scheidecker et al. | 252/62.51 |
| 5,164,104 | 11/1992 | Kobayashi et al. | 252/62.57 |
| 5,228,185 | 7/1993 | Higashihara et al. | 29/603 |
| 5,250,150 | 10/1993 | Gaud et al. | 156/647 |
| 5,356,514 | 10/1994 | Kinoshita | 156/643 |

OTHER PUBLICATIONS

Ferrite Cores Design Guide & Product Catalog/Ferronics Incorporated Copyright 1991.

Soft Ferrites—A User's Guide/Magnetic Materials Producers Association, Chicago, Illinois 60605—Copyright 1992.

Knowles, The effect of surface grinding upon the permeability of manganese–zinc ferrites, Feb. 23, 1970, J. Phys. D: Appl. Phys., 1970 vol. 3.

Snelling, The Effects of Stress on Some Properties of MnZn Ferrite, Apr. 6, 1974.

Knowles, The Origin of the Increase in Magnetic Loss Induced by Machining Ferrites, Oct. 15, 1974, IEEE Transactions on Magnetics, vol. Mag–11, No. 1, Jan. 1975.

Primary Examiner—Christopher A. Fiorilla
Attorney, Agent, or Firm—Cumpston & Shaw

[57] ABSTRACT

A method and apparatus for establishing the magnetic permeability of a batch ferrites at a predetermined target permeability. Ferrite parts are sintered to achieve a magnetic permeability greater than the target permeability. The sintered parts are then tumbled to suppress the magnetic permeability below the target permeability. The parts are then exposed to a chemical wash to increase the magnetic permeability and continuously monitored to allow setting the magnetic permeability at the target permeability.

14 Claims, 5 Drawing Sheets

METHOD FOR ESTABLISHING A TARGET MAGNETIC PERMEABILITY IN A FERRITE

FIELD OF THE INVENTION

The present invention relates to the manufacture of ferrites having a target magnetic permeability, and more particularly, to creating a magnetic permeability in a ferrite higher than the target permeability, suppressing the permeability below the target permeability, and restoring the permeability to the target permeability.

BACKGROUND OF THE INVENTION

Ferrites are homogeneous ceramic materials composed of various oxides containing iron oxide as their main constituent. Being ceramic, ferrites are hard, inert and free of organic substances. Ferrites can have several distinct crystal structures, for example, magnetic soft ferrites have a cubic crystal structure.

Soft ferrites can be divided in two major categories, based upon chemical composition, manganese-zinc (MnZn) ferrite and nickel-zinc (NiZn) ferrite. In each of these categories, many different MnZn and NiZn material grades can be manufactured by varying the chemical composition or manufacturing parameters.

Soft ferrites are employed in the power transformer and chokes as used in high frequency power supplies; inductors and tuned transformers in frequency selective circuits; pulse and wide band transformers; magnetic deflection structures in TV sets and monitors; recording heads for magnetic storage devices; rotating transformers for VCR's; and shield beads and chokes for interference suppression.

Ferrites are especially useful due to a combination of high magnetic permeability which concentrates and reinforces a magnetic field and the high electrical resistivity which limits the amount of electric current flow in the ferrite. An important parameter in the application of the ferrite is the magnetic permeability. The magnetic permeability $\mu$ is the ratio of magnetic flux density B in Gauss to magnetic field strength H in Oersteds ($\mu=B/H$).

Traditionally, magnetic permeability has been dictated by the selection and mixture of the constituent materials, the powder preparation, sintering and finishing techniques.

However, due to variations in parameters such as heating within a kiln, material impurities, moisture content of the air and ambient impurities, it is difficult to obtain a magnetic permeability for a given batch of parts within approximately 25–30% of a target value. That is, if the target magnetic permeability of a part is 10,000, the permeability generally acceptable in the market is between 7,500 and 12,500. However, for a number of applications, manual testing of the individual ferrite components is required to employ only those components having a magnetic permeability within a tighter tolerance range. The manual testing of individual parts slows the manufacturing process and increases the cost.

Therefore, the need exists for a method and apparatus for forming a ferrite, wherein the magnetic permeability may be set within a tolerance of less than 10% of a target value. The need also exists for the manufacture of ferrites without requiring extensive individual testing and processing, so that the ferrites may be economically manufactured. Further, the need exists for establishing a magnetic permeability in a ferrite which can accommodate increased tolerances in other stages of the manufacturing process.

SUMMARY OF THE INVENTION

The present invention includes a method and apparatus for forming a batch of ferrite parts having a target magnetic permeability.

Generally, the present method includes sintering a green material to introduce a magnetic permeability greater than the target magnetic permeability; mechanically stressing the sintered part in a flowable medium to suppress the magnetic permeability below the target permeability; washing a batch of the tumbled parts in an acid wash to increase the magnetic permeability of the parts; monitoring the magnetic permeability of a subset of the batch; and terminating the wash when the magnetic permeability of the subset is at the target permeability.

The present apparatus includes a chemical wash; a batch processing tray for immersion in the chemical wash; an inductance monitor for measuring the inductance of a subset of the batch in the wash and lifter for removing the batch from the wash in response to a measured inductance.

DETAILED DESCRIPTION OF THE PREFERRED EMBODIMENTS

Figure 1:
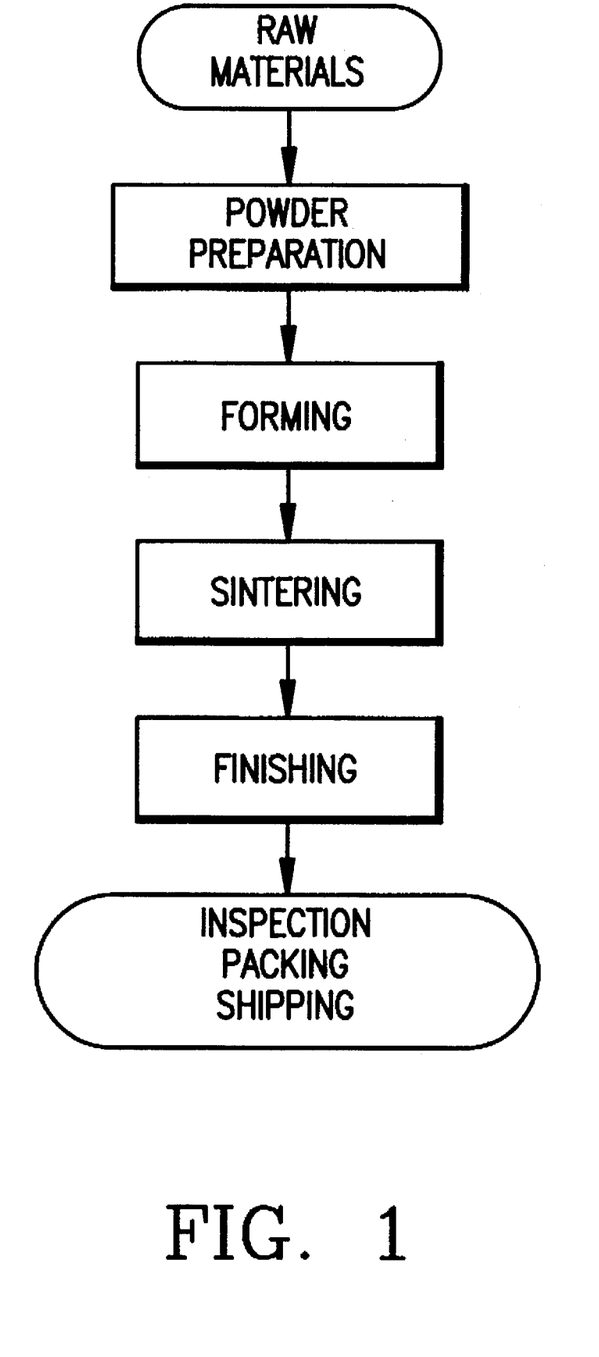
FIG. 1 is a processing flow diagram for the manufacture of a ferrite.

Ferrites are manufactured by processing a composition of iron oxide mixed with other major constituents such as oxides or carbonates of either manganese and zinc or nickel and zinc. Referring to FIG. 1, the basic process common to most ceramic process technologies and can be divided into four major steps (1) preparation of the powder; (2) forming the powder into parts; (3) firing or sintering; and (4) finishing the ferrite components.

Figure 2:
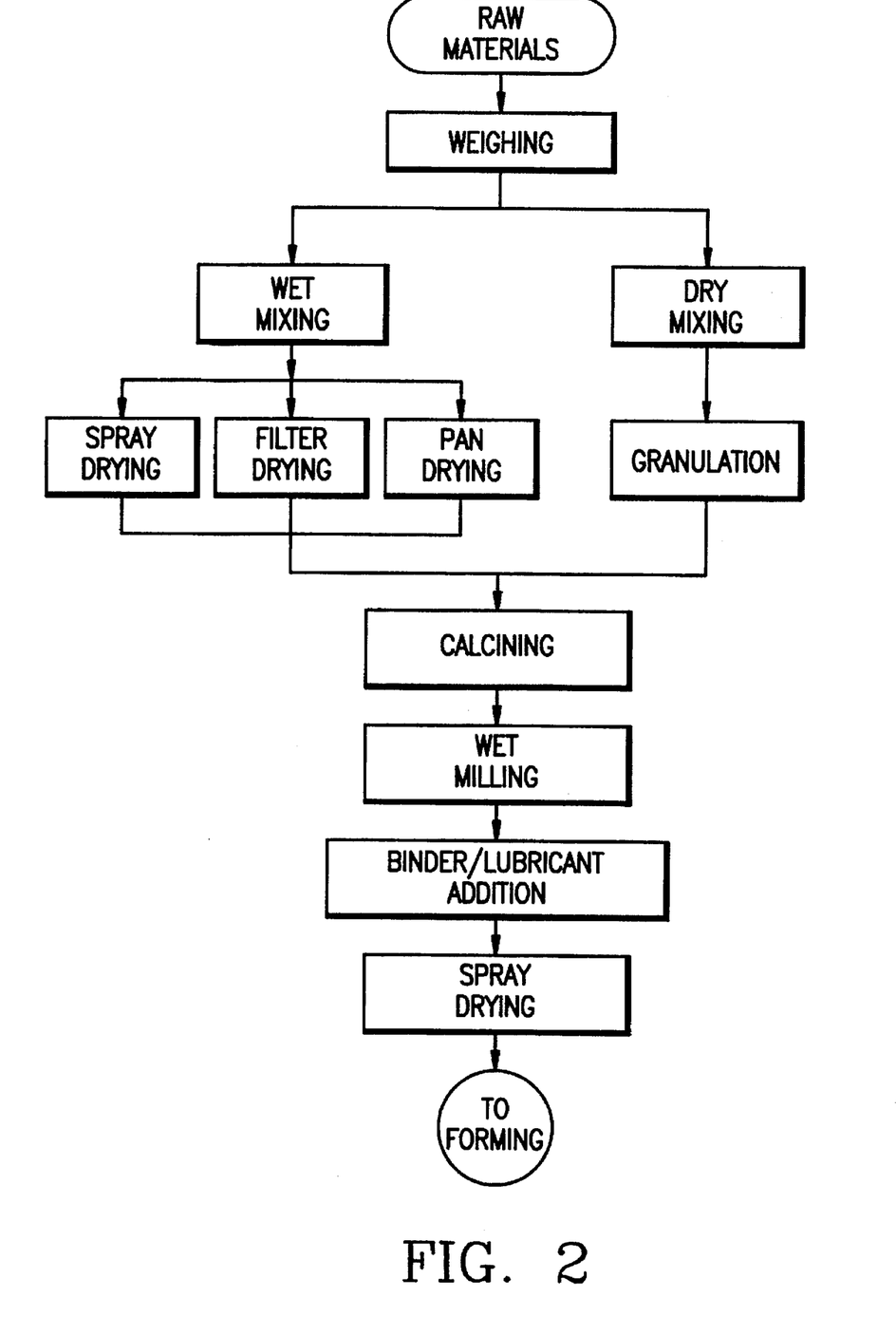
FIG. 2 is a powder preparation flow chart showing the preparation of the base material.

Referring to FIG. 2, a typical ferrite powder processing flow diagram is shown. The first step in the preparation of the powder starts with the chemical analysis of the raw materials, the oxides (or carbonates) of the major constituents. The impurities of these materials contributes directly to the quality of the final product and needs to be controlled to assure batch consistency. Preferably, the purity is at least 99.5% and further impurities are suppressed as much as possible. For example, excessive silica in manganese-zinc ferrite will severely limit the obtainable permeability.

The exact amount of the major constituents is weighed and thoroughly mixed into a homogeneous mixture. The chemical composition must be kept within allowable limits to achieve desired magnetic permeabilities. A typical tolerance is approximately 0.1%. The mixture of the major constituents can be done in a dry process or water can be added to form a slurry and then mixed in a ball mill. When wet mixing is used, a drying procedure is required to reduce the moisture content prior to calcining.

The mixture is then calcined, a prefiring process in which the powder temperature is raised to approximately 1000° C. in an air atmosphere. During the calcining, there is a partial decomposition of the carbonates and oxides, evaporation of the volatile impurities in a homogenization of the powder mixture. There is a degree of spinel conversion during calcining and this prefiring step also reduces the shrinkage in the final sintering process.

After calcining, the powder is mixed with water and the slurry is ball milled to obtain small and uniform particle sizes. At this stage, the process binders and lubricants are added. The type of binder and lubricant is determined by the specific requirements of the finished product. The moisture content, flowability, and particle size distribution is controlled to insure the integrity of the part.

The last step in the powder preparation is to spray dry the slurry in a spray dryer.

Forming the Powder into Parts

The second step in ferrite processing is forming the component or part. The most commonly used technique is dry pressing the powder into the part configuration. Other techniques are extruding and isostatic pressing. Dry pressing or compacting is done using a combined action of a top and bottom punch in a cavity such that uniform density in the part is obtained. The commercially available presses and tooling technology enable the pressing of multiple parts in very complex core shapes. The parts may be any of variety of shapes such as pot cores, RM cores, solid center post RM cores, E cores, U cores, EP cores toroids, multi-aperture cores, rods, tubes, strips and EMI cores. Sintering shrinkage is a function of the density of the green (unsintered) part, the press density is controlled in order to achieve a desired sintered dimension. Further, green density uniformity must be controlled over the entire volume of a pressed part to prevent distortion upon sintering such as warpage of the E Core legs, or cracked cores.

Sintering

Figure 3:
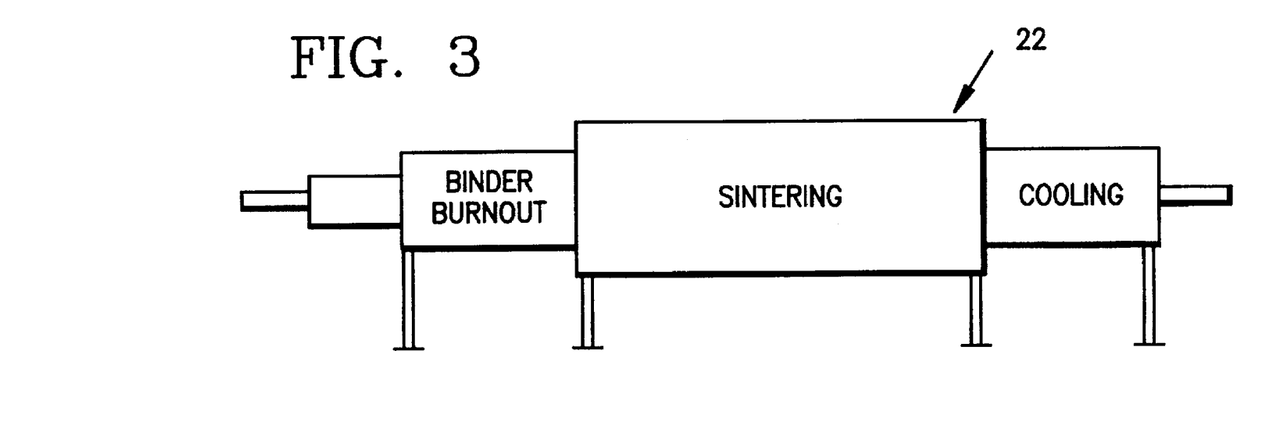
FIG. 3 is a schematic representation of a sintering device.
Figure 4:
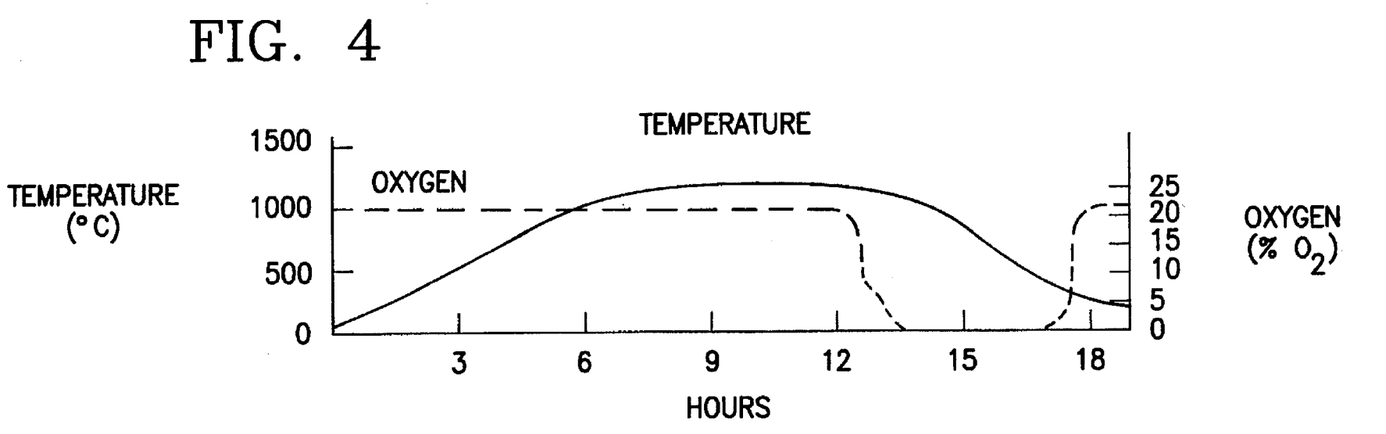
FIG. 4 is a graph showing a typical MnZn sintering cycle.

The sintering is the most critical step in the manufacturing of ferrites. During the sintering phase, the product acquires its magnetic and mechanical characteristics. sintering includes heating the parts in a kiln or oven 22. The specific temperature profile and environment in which the sintering occurs depends on the specific part and composition of the ferrite. As shown in FIGS. 3–4, the temperature and atmosphere are varied throughout the sintering process.

The sintering of MnZn ferrites requires a relationship between time, temperature and atmosphere along each phase of the sintering cycle. Sintering starts with a gradual ramping up from room temperature to approximately 800° C. as impurities, residual moisture, binders, and lubricants are burned out of the product. The atmosphere in this part of the sintering cycle is air.

The temperature is further increased to the final sinter temperature of approximately 1000°–1500° C., depending on the type material. While the temperature is decreasing, a non oxidizing gas, such as nitrogen, is introduced into the kiln to reduce the oxygen content of the kiln atmosphere. During the cool-down cycle, a reduction of oxygen pressure is very critical in obtaining high quality MnZn ferrites.

The sintering of nickel-zinc ferrites occurs at lower temperatures, generally in the range of 1000°–1200° C. This material may be sintered in an air atmosphere.

Temperatures constituting the sintering process must be maintained within narrow tolerances in order that correct physical and magnetic properties are obtained. Improper control during the initial stages of sintering can result in physical problems due to overly rapid binder removal. Poorly controlled initial stages of heating or later stages of cooling, can result in stress induced fracture. A difference of as little as 3° C. out of 1400° C. in peak temperature can have a profound negative effect on final properties.

In addition, proper control of the atmosphere during sintering is necessary to achieve the desired magnetic properties. It has been found, that inadequate control to the extent of 0.1% oxygen during the cooling stages of sintering a MnZn ferrite or even 0.01% oxygen at the end of the process can have extremely deleterious effects.

During sintering, the parts shrink to their final dimensions. Different material and processing techniques result in variance in this shrinkage, but typical linear shrinkage ranges from 10 to 20% of the formed dimensions. The final part dimensions can be held to mechanical tolerances of ±2% of the nominal part dimensions.

As a result of sintering, the parts achieve their highest magnetic permeability. In the present method, the permeability after sintering is higher than the target permeability of the finished product.

Suppression of Magnetic Permeability

The sintered parts are then tumble processed to reduce the magnetic permeability of the parts. The parts are tumbled in a flowable medium such as grit, sand, or spheres or particles of ceramic, glass, sand, or metal. The tumbling media and tumbling parameters are dictated by the composition of the part, the part size and the necessary depression of the permeability.

While it is only necessary to depress the magnetic permeability below the target permeability, preferably, the tumbling is carried out until the permeability of the parts is approximately ½ of the sintered permeability.

Figure 5:
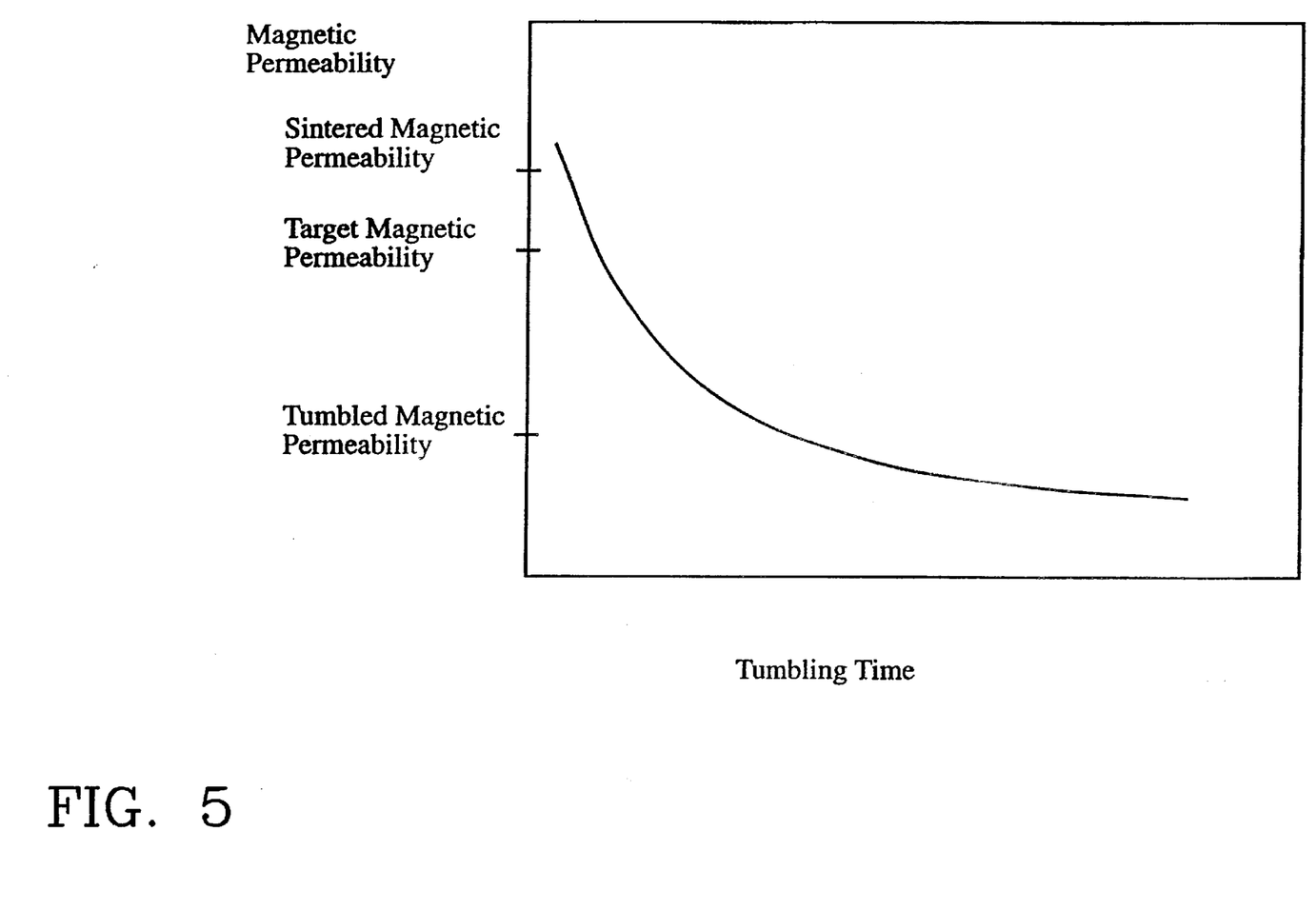
FIG. 5 is a graph showing the relation of tumbling time to magnetic permeability.

Referring to FIG. 5, the dependence of magnetic permeability on tumbling decreases in time, and especially after the permeability has been suppressed to approximately half its original sintered value. By suppressing the permeability to approximately half of the sintered permeability, the uniformity of the suppressed magnetic permeability within a given tumbled batch is within a smaller tolerance, than if suppression is less than 50% of the sintered magnetic permeability.

Setting the Magnetic Permeability to the Target Value

The sintered and tumbled parts having a magnetic permeability below the target permeability are then exposed to a chemical wash. The chemical wash is preferably an acid wash. Muriatic, phosphoric, nitric and sulphuric acids may be used. The preferred acid is hydrochloric acid at room temperature and at approximately 36% concentration. The exposure of the tumbled parts to the acid wash restores the magnetic permeability of the parts. The length of exposure of the parts to the chemical wash is monitored so that the wash is terminated upon the parts reaching the target magnetic permeability.

If the acid wash is terminated prematurely, the wash may be reinstated to continue restoring the magnetic permeability to the target value. Conversely, if the acid wash is carried on past the target permeability, the parts may be retumbled to suppress the magnetic permeability below the target permeability and the parts rewashed to obtain the target permeability.

The monitoring of the parts in the acid wash may be achieved in a variety of ways. Specifically, three small samples of a batch of tumbled parts are separated from the remaining batch. The first sample is exposed to the acid wash for two minutes; the second sample is exposed to the acid wash for five minutes and the third sample exposed to the acid wash for ten minutes. The magnetic permeability via the inductance of each sample is measured and plotted on a graph of inductance (magnetic permeability) v. time. Then from the graph, the chemical wash time to obtain the target magnetic permeability is determined and the remaining portion of the batch is exposed to the chemical wash for that period of time.

It is understood the actual test times may vary depending upon the specific acid wash and the configuration of the part. The times are selected so that one subset exposure sets a magnetic permeability less than the target permeability and another subset exposure sets a magnetic permeability greater than the target permeability.

Alternatively, a sample of the batch may be strung on a single wire and the sample and remainder of the batch placed in the acid wash. As the measured inductance relates to the magnetic permeability by the formula $L = 2 \mu h \ln O.D./I.D. \cdot 10^{-9}$ where L is the inductance in Henries; $\mu$ is the magnetic permeability; h is the height in centimeters; O.D. is the outer diameter and I.D. is the inner diameter of the part, the magnetic permeability can be continuously monitored by continuously monitoring the inductance.

Upon the inductance reaching the level corresponding to the target magnetic permeability, the parts are removed from the acid wash and rinsed with water to terminate further restoration of the magnetic permeability.

It is known that inductance is related to magnetic permeability by the above formula. Therefore, as the inductance of the sample parts is continuously monitored, the changing magnetic permeability may be monitored and stopped at the target permeability. The specific time necessary for the restoration of the magnetic permeability depends upon a number of factors including the acid, the specific material of the ferrite; the amount the magnetic permeability is depressed by tumbling and the temperature of the acid. The continuous monitoring of the magnetic permeability (via the inductance) accommodates all the variable parameters. That is, by continuously monitoring the change in magnetic permeability, the resulting influence of a change in any of the parameters is accounted for in the duration of the wash.

Figure 6:
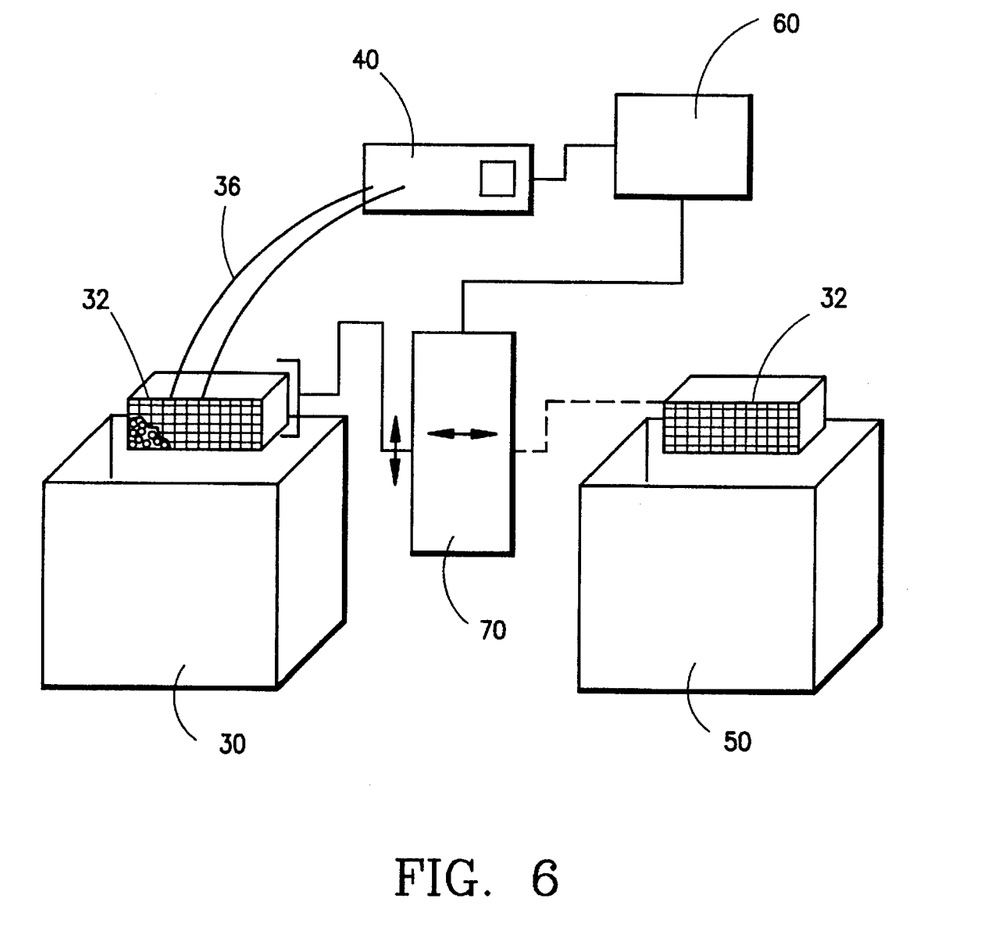
FIG. 6 is a schematic perspective of the present apparatus.

The apparatus for implementing the present method includes a wash tub 30, a tray 32, and an inductance monitor 40. In an automated system, the apparatus further includes a controller 60 and a lifter 70.

The wash tub 30 is an acid resistant vessel. Similarly, the tray 32 is acid resistant and is porous or vented to permit a free flow of acid into and out of the tray. The tray 32 is connected to the lifter 70 for selectively placing the tray in contact with the acid and out of contact with the acid. The lifter 70 is also operable over a limited range to slightly oscillate the tray to induce a flow of acid across the parts.

The monitor 40 is any of a variety of commercially available inductance meters such as HP-4284A LCR meter. The controller 60 is a desktop computer operably connected to the lifter 70 and the monitor 40. The controller 60 receives signals from a monitor 40 which represent the inductance of the monitored part(s), and translates the inductance to a corresponding magnetic permeability upon reaching an inductance value corresponding to the target magnetic permeability. The controller 60 directs the lifter 70 to remove the tray 32 from the acid wash and initiate a rinse of the parts in a rinse tub 50.

In a specific batch processing of a MnZn ferrite, the powder formation and forming is accomplished as well known in the industry. The parts were sintered at a temperature of 1380° C. to achieve a maximum magnetic permeability of approximately 12,000 to 13,000. The sintered parts were then tumbled in a fine 60 grit sand in a ratio of 1 part media to two parts ferrites at 80 Rpm's in a Harper tumbler. The Harper tumbler is a standard tumbler and rotates the parts about two axes. The ratio of tumbling media to parts may be varied between 1:1 to 1:3, however, a ratio of 1:2 is preferable. The tumbling occurs for approximately 3 to 4 minutes and suppresses the magnetic permeability to approximately 5,000 to 6,000. The tumbling also rounds the sharp edges of the sintered parts to enhance subsequent winding operations.

A sample of the tumbled parts is strung onto a conductive wire 36 and connected to the inductance monitor 40. In the present embodiment, a 26 gage wire having a length of approximately 7 feet is used to retain the sample parts for measuring inductance. The monitored parts and remaining portion of the batch are put in the tray 32 and immersed in a hydrochloric acid of approximately 36% solution at room temperature. A sufficient amount of acid is employed to cover all the parts and permit a slight agitation so that a relatively uniform concentration of acid is exposed to the parts. Depending upon the age of the acid, the part configuration on the specific material, the wash time may be approximately 5 to 15 minutes. Upon the monitored inductance of the sample parts reaching a value corresponding to the target permeability, the entire batch of parts are removed from the chemical wash and immersed in the water tub 32 and then rinsed with water.

The present invention thereby allows adjustment of the magnetic permeability of a batch of parts. That is, if a given batch of parts has a given distribution profile of magnetic permeability about a given value which is greater than a target value, the present invention allows the distribution profile of the batch to be shifted and accurately centered about the target value.

The present invention also accommodates variances in manufacturing of the sintered part. Specifically, for a given batch (common powder preparation, formation and sintering) fluctuations in parameters such as kiln temperature may result in an undesirably wide distribution of the parts about a given magnetic permeability. The selection of portions of the batch having a relatively narrow distribution about a given magnetic permeability (higher than the target permeability) may be subjected to the present invention to center the distribution at the target permeability. Therefore, by individually exposing separate sub batches (each sub batch having a narrow tolerance about a given magnetic permeability) to the present invention, an entire batch can be manufactured to center the distribution about the target permeability within the narrow tolerances of the sub batches.

By the present method, it has been found that the distribution of the magnetic permeability of parts having 10,000 perm may be shifted to within approximately ±5% of the target permeability.

The ability of the present invention to establish a magnetic permeability in response to monitoring the change in the permeability, allows a greater accuracy of the final part. Further, the monitored adjustment of the magnetic permeability can accommodate uncontrollable, or even unintended variances in the formation of the sintered part. That is, unlike the prior art which sets the final magnetic permeability, the present method only requires the formation and sintering of a part to obtain a magnetic permeability greater than the target permeability.

The suppression of the magnetic permeability below the target level and preferably to a relatively tumbling insensitive level, followed by the controlled and monitored restoration of a portion of the original sintered magnetic permeability allows the present process to produce ferrites wherein the center of the distribution of the magnetic permeability is within approximately ±5% of a target magnetic permeability.

The parts having the target magnetic permeability may then be finished by a coating with nylon, epoxy paint or parylene. Nylons and epoxy paints typically need a minimum coating thickness of approximately 0.005 inches to insure uniform protection. Because of this restriction, they are used mainly on toroids with an outer diameter of 0.500 inches or greater. One advantage of these coatings is that the color can be varied for core material identification without stamping.

A smooth coating can be provided to finish the part for operable assembly. This coating is preferably soft to prevent stressing the core upon curing or during temperature cycling, and has a low coefficient of friction and can withstand normal operating environments including cleaning solvents.

Parylene™C is used for smaller cores. The Parylene™ is vapor deposited and produces an exceptionally uniform coating having a thickness of approximately 0.0006 inches. The epoxy may be sprayed on larger cores in providing a variable thickness of about 0.001 to 0.005 inches.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed:

1. A method of manufacturing a batch of ferrite parts having a target magnetic permeability, comprising:
   (a) forming the batch of parts of an unsintered material;
   (b) sintering the batch of parts at a sufficient temperature to introduce a magnetic permeability greater than the target magnetic permeability;
   (c) tumbling the sintered batch of parts in a flowable medium to suppress the magnetic permeability below the target magnetic permeability;
   (d) exposing the batch of tumbled parts to an acid wash;
   (e) continuously monitoring the magnetic permeability of a subset of the batch in response to the acid wash; and
   (f) terminating the wash when the magnetic permeability of the subset reaches the target magnetic permeability.

2. The method of claim 1, further comprising employing a flowable medium having an average particle size of approximately 60 grit.

3. The method of claim 1, wherein the acid wash is hydrochloric acid.

4. The method of claim 1, further comprising rewashing the subset upon the monitored magnetic permeability being less than the target magnetic permeability.

5. The method of claim 1, further comprising retumbling the sintered and washed parts upon the monitored magnetic permeability being greater than the target magnetic permeability.

6. A method for creating a target magnetic permeability in a ferrite, comprising:
   (a) sintering a formed green material to achieve a magnetic permeability greater than the target magnetic permeability;
   (b) introducing stresses into the surface of the sintered material to reduce the magnetic permeability below the target magnetic permeability;
   (c) treating the surface of the material with an acid wash to increase the magnetic permeability as a function of time;
   (d) simultaneously monitoring the magnetic permeability until the target magnetic permeability is reached; and
   (e) terminating the treating step upon reaching a predetermined magnetic permeability.

7. The method of claim 6, wherein introducing stresses includes tumbling the sintered material in a flowable medium.

8. The method of claim 6, wherein monitoring the magnetic permeability includes monitoring the inductance of the material in the acid wash.

9. A method of manufacturing a batch of ferrite parts having a target magnetic permeability, comprising:
   (a) tumbling a batch of ferrites having a magnetic permeability greater than the target magnetic permeability in a flowable medium to reduce the magnetic permeability below the target magnetic permeability;
   (b) selecting a subset from the batch;
   (c) determining a sufficient exposure time for the subset of the tumbled ferrites to an acid wash to increase the magnetic permeability to the target magnetic permeability; and
   (d) exposing a remaining portion of the batch to an acid wash for the sufficient exposure time.

10. The method of claim 9, wherein determining the sufficient exposure time includes monitoring the inductance of the material in the acid wash.

11. The method of claim 9, wherein determining the sufficient exposure time and exposing the remaining portion are substantially simultaneous.

12. A method for creating a target magnetic permeability in a ferrite, comprising:
   (a) sintering a batch of ferrites to establish a magnetic permeability greater than the target magnetic permeability;
   (b) tumbling the batch of ferrites in a flowable medium to reduce the magnetic permeability below the target magnetic permeability; and
   (c) exposing the tumbled ferrites to an acid wash to increase the magnetic permeability to the target magnetic permeability.

13. The method of claim 12, further comprising monitoring the magnetic permeably of a subset of the batch during exposure to the acid wash.

14. The method of claim 13, further comprising terminating the acid wash upon the magnetic permeability of the subset reaching the target magnetic permeability.

* * * * *

UNITED STATES PATENT AND TRADEMARK OFFICE
CERTIFICATE OF CORRECTION

PATENT NO. : 5,645,774
DATED : July 8, 1997
INVENTOR(S) : Reczek et al.

It is certified that error appears in the above-indentified patent and that said Letters Patent is hereby corrected as shown below:

"On the Cover Sheet, in Column 1, Item [30] should be moved to the end of Item [56] in Column 2, and appear as follows:

--Foreign Patent Documents
  1-242788   9/1989   Japan--.

Signed and Sealed this

Tenth Day of March, 1998

*Attest:*

BRUCE LEHMAN

*Attesting Officer*     Commissioner of Patents and Trademarks